US010459433B2

(12) United States Patent
Agustoni et al.

(10) Patent No.: US 10,459,433 B2
(45) Date of Patent: Oct. 29, 2019

(54) CABLE PROCESSING EQUIPMENT

(71) Applicant: Komax Holding AG, Dierikon (CH)

(72) Inventors: Thomas Agustoni, Buchrain (CH); Peter Flury, Gunzwil (CH); Stefan Viviroli, Horw (CH)

(73) Assignee: KOMAX HOLDING AG, Dierikon (CH)

( * ) Notice: Subject to any disclaimer, the term of this patent is extended or adjusted under 35 U.S.C. 154(b) by 180 days.

(21) Appl. No.: 14/941,877

(22) Filed: Nov. 16, 2015

(65) Prior Publication Data
US 2016/0139590 A1 May 19, 2016

(30) Foreign Application Priority Data

Nov. 18, 2014 (EP) .................................... 14193609

(51) Int. Cl.
*G05B 19/418* (2006.01)
*H01R 43/052* (2006.01)
*B25J 9/16* (2006.01)

(52) U.S. Cl.
CPC ...... *G05B 19/41805* (2013.01); *B25J 9/1602* (2013.01); *H01R 43/052* (2013.01); *G05B 2219/32061* (2013.01); *G05B 2219/50386* (2013.01)

(58) Field of Classification Search
CPC .... G05B 19/41805; G05B 2219/32061; G05B 2219/50386; B25J 9/1602; H01R 43/052
USPC ....................................................... 700/122
See application file for complete search history.

(56) References Cited

U.S. PATENT DOCUMENTS

| 5,153,839 A * | 10/1992 | Cross ............... G05B 19/41835 29/33 M |
| 2001/0035039 A1 * | 11/2001 | Ooji ..................... H01R 43/055 72/420 |
| 2001/0047674 A1 * | 12/2001 | Meisser ............. H01R 43/0488 72/20.1 |

(Continued)

FOREIGN PATENT DOCUMENTS

| CN | 102210164 A | 10/2011 |
| CN | 103676790 A | 3/2014 |

(Continued)

OTHER PUBLICATIONS

The Safety Technology Manual of the Beijing Institute of Labor Protection Science: "Safety Technical Manual", Dec. 31, 1985 pp. 84-85.

*Primary Examiner* — Robert E Fennema
*Assistant Examiner* — Jigneshkumar C Patel
(74) *Attorney, Agent, or Firm* — William J. Clemens; Shumaker, Loop & Kendrick, LLP

(57) ABSTRACT

Cable processing equipment for fitting out cables includes local control units for local setting-up of the processing stations, for example a crimping station. The local control unit of the crimping station has a trigger button for triggering the processing process and an approval button for approval of whether the crimping process is to be executed. The processing process can be started only with simultaneous pressing of the trigger button and the approval button. Moreover, the local control unit includes a cable call button for activating a feed unit for feeding a cable end of the cable to the crimping station.

12 Claims, 3 Drawing Sheets

(56) References Cited

U.S. PATENT DOCUMENTS

| | | | | |
|---|---|---|---|---|
| 2005/0050722 A1* | 3/2005 | Viviroli | ............. | H01R 43/0488 |
| | | | | 29/729 |
| 2014/0115855 A1* | 5/2014 | Angelov | ................ | H01R 43/28 |
| | | | | 29/407.01 |
| 2015/0340827 A1* | 11/2015 | Hallman | ............. | H01R 43/048 |
| | | | | 29/863 |
| 2016/0370785 A1* | 12/2016 | Kaufleitner | ........ | G05B 19/0425 |

FOREIGN PATENT DOCUMENTS

| | | |
|---|---|---|
| DE | 102011102274 A1 | 11/2012 |
| EP | 0290641 A1 | 11/1988 |
| EP | 1073163 A1 | 1/2001 |
| EP | 1251605 A1 | 10/2002 |
| EP | 1341269 A1 | 9/2003 |
| EP | 1447888 A1 | 8/2004 |
| WO | 00/62381 A1 | 10/2000 |

* cited by examiner

CABLE PROCESSING EQUIPMENT

FIELD

The invention relates to cable processing equipment and a method of operating cable processing equipment.

BACKGROUND

In the fitting-out of cables, cable ends of the cables are crimped or processed in some other way. By "crimping" there is understood the production of a non-detachable electrical and mechanical connection (crimp connection) by plastic deformation between a conductor and a crimp contact. For higher demands with respect to tightness, the stripped cable ends can be equipped with bushes in bushing stations prior to the crimping.

Cable processing equipment comparable with the category has become known from EP 1 447 888 A1. EP 1 447 888 A1 shows cable processing equipment with a stripping unit and two crimping stations with crimping presses. The device further comprises cable advancing means, constructed as a belt drive, for moving the cable along a machine longitudinal axis. The stripping unit for cutting to length and stripping the cable ends is arranged on the machine longitudinal axis. However, since the two crimping press stations are disposed near the machine longitudinal axis the cable has to be guided to the respective crimping presses of the crimping stations by means of pivot arms, which are provided with grippers, of pivot units, for which reason this type of cable processing equipment is also known and familiar to the expert under the designation 'pivot machines'. In that case, the leading cable end is fitted in the first crimping press, and the trailing cable end by the second crimping press, with crimp contacts. The cable processing equipment can be monitored and controlled by way of a central control unit.

So-called 'linear machines' or 'transfer machines' are a further known type of cable processing equipment. In these cable processing machines the respective cable processing stations are arranged on a line along the machine principal axis. Cable processing equipment of that kind has become known from, for example, EP 1 073 163 A1, this cable processing equipment also having a central control unit.

The central control units of the known cable processing equipment have proved themselves with respect to production operation. Process parameters can be set and monitored in simple manner by the central control unit. However, prior to mass production of fitted-out cables the individual processing stations have to be set up. Depending on the respective cables, crimp contacts and/or bushes to be processed it is necessary to adapt machine settings to the different requirements. This setting-up process is particularly important with respect to the crimping stations, since the cable ends to be processed have to be positioned as precisely as possible in the crimping tool of a crimping press of the crimping station. Setting up can also be necessary after a change of the crimping tool. The operator in that case physically checks whether the settings that have been undertaken are correct. For that purpose individual processing processes have to be performed in test mode. Triggering takes place by way of the central control unit, for which reason the operator has to move back and forth between the central control unit and the processing stations. A further problem is that, particularly in the presence of two operatives, the risk potential increases since the operator present at the processing station is at risk due to the processing processes triggered by the central control unit.

SUMMARY

It is accordingly an object of the present invention to avoid the disadvantages of the prior art and, in particular, to create cable processing equipment which is to be operated simply and safely with respect to the setting-up of the cable processing equipment.

According to the invention this object is fulfilled by cable processing equipment that serves particularly for fitting-out cables and comprises processing stations for processing cable ends of the cables. Such processing stations are, for example, stripping stations, bushing stations and crimping stations. The cable processing equipment comprises a central control unit by way of which the processing stations are activatable and controllable at least with respect to production operation. Due to the fact that at least one of the processing stations, for example a crimping station, has a local control unit for local setting up of the respective processing station, the setting-up process can be carried out quickly, safely and simply. To be understood by "setting up" in the present case is the initial setting of the parameters of a respective processing station prior to the start of the production process. Thus, for example, in the setting up of the crimping process on a crimping station it has to be ensured that the crimp connection corresponds with the specifications. In particular, it has to be checked whether the prescribed cable cross-section is processed and whether the crimp connection has the specified crimp height. In cable processing, setting up entails actions which usually require the presence of the cable in or at the processing station and in which the operator can, in the ideal case, also observe the working process. For that purpose the operator can perform the respective process in a single step, at reduced speed or in a single cycle. An element of the setting up can also be positioning of the cable as accurately as possible with respect to the processing station. The setting-up process is particularly important, since in the production process, which follows the setting-up process and in which mass production takes place on the basis of the operating parameters set in the setting-up stage, in many cases it can be checked only by random sampling whether the cable products produced (for example, the crimped cable ends) satisfy the required quality criteria. Thanks to the local control unit it is possible to carry out setting-up operations directly at the respective processing station. A visual check of the intermediate results of the individual working steps during setting up is ensured at any time. Since it is not necessary to go back to the central control unit during the setting up, alternation between local control unit and central control unit is eliminated. The processing stations can thus be set up in a more efficient way.

It is advantageous if a local control unit of at least one of the processing stations comprises input means for approval of whether a processing process is to be executed. The input means can be, for example, an approval button. However, as an alternative to tactile input means, other input means such as, for example, a touch-sensitive screen surface would also be conceivable. The approval could, however, also take place in a different way, for example via spoken commands at appropriate input means.

It is particularly advantageous if the input means for the approval of whether a processing process is to be executed are locally separated from the input means for triggering the processing process in such a way that the aforesaid input means are not simultaneously selectable by one hand of a human operator. In this way, personal safety can be increased, since, for example, no hand of the operator enters the crimping press during the setting up and the operator cannot be injured. The input means for triggering the processing process can be, for example, a trigger button.

The input means for triggering the processing process and the input means for approval of whether the processing process is to be executed can be spaced from one another by at least 27 centimeters. As a result, local separation of the two input means is achieved in simple manner so as to prevent single-handed operation with respect to triggering the processing process.

In a further form of embodiment a local control unit of at least one of the processing stations comprises input means for approval of whether a processing process is to be executed and input means for triggering the processing process, wherein the processing process in the respective processing station can be started only when the two input means are simultaneously selected. Single-handed operation is thereby virtually excluded.

The cable processing equipment can comprise, as processing station, a crimping station for production of a crimp connection by a crimping press. In that case, the crimping station can comprise input means for approval of whether a processing process is to be executed, for example an approval button. Moreover, the crimping station could comprise a trigger button. A crimping process can be initiated by the trigger button, wherein, however, the crimping process is started only after pressing, for example, an approval button by which it is checked whether an already triggered processing process is to be actually executed.

Further advantages arise if a local control unit of at least one of the processing stations and preferably at least the crimping station comprises respective input means for activation of a feed unit for feeding a cable end of the cable to the respective processing station, for example to the crimping station, and preferably for activation of a stripping station for prior cutting to length and stripping the cable end, before the cable end is conducted to the processing station (for example, to the crimping station). The setting-up process can be further simplified and accelerated by such an embodiment of cable processing equipment. The input means mentioned here can be, for example, a cable call button. The control of the cable processing equipment is designed in such a way that after or through pressing the cable call button the cable end is firstly automatically cut to length and stripped in the stripping station according to respective requirements and then conducted to the appropriate processing station, whereupon the operator can start the setting-up operations at the respective processing station. The control of the cable processing equipment can in that case advantageously be such that the feed process can be started only on simultaneous pressing of the cable call button and the approval button.

It is particularly advantageous if the feed unit comprises a pivot unit, which is rotatable about a vertical axis, with a gripper. Automated feed by the cable call button has particular advantages with cable processing equipment designed as a pivot machine. However, the cable processing equipment can also be designed as a transfer machine. Cable processing equipment of that kind can comprise a feed unit with a transfer unit with a gripper, which is movable along a machine longitudinal axis, for transporting the cable. However, other conveying means such as, for example a belt drive, are also conceivable instead of a gripper, for example a pull-out gripper. The processing stations, for example a stripping station as well as a first crimping station for the trailing cable end and a second crimping station for the leading cable end as well as further processing stations (such as, for example, bushing stations), can be arranged in a line in succession on the machine longitudinal axis. The stripping unit can be arranged, for example, between first and second crimping stations with respect to the conveying direction or along the machine longitudinal axis. The translationally movable extraction gripper can additionally also be movable transversely to the machine longitudinal axis, for example for vertical positioning of the cable ends for a processing process and, in particular, displaced by right angles to the machine longitudinal axis.

If the cable equipping processing equipment comprises, as processing station, a crimping station for production of a crimp connection by a crimping press it can be advantageous if the crimping station comprises a local control unit with input means for setting the axial and/or horizontal position of a gripper, which holds a cable end of the cable, of a feed unit in the crimping press of the crimping station. The expenditure of time for setting up the cable processing equipment can thus be further significantly reduced.

It is advantageous for further increase in safety of persons if at least one region of the cable processing equipment is or can be protected by a protective hood and if optical or acoustic warning and user guide elements are provided, which indicate when the protective hood is in an open setting and which—if optical warning and user guide elements are provided—can optionally light up at least one sub-region of the mentioned region of the cable processing equipment. Such a sub-region can be, for example, the region around a knife head with stripping knives of a stripping station. For safer operation of a stripping station it can be advantageous if the optical warning and user guide elements light up or can light up the hazardous location with the knife head. For that purpose, use can be made of, for example, a lamp equipped with one or more light-emitting means.

A local control unit of at least one of the processing stations can comprise indicating means, for example optical, acoustic or haptic indicating means, for indicating operational states. The indicating means assist the operative to rapidly obtain data with respect to operational states.

The indicating means can, with particular advantage, comprise light-emitting elements for indicating a readiness mode and the presence of the cable, in which the respective processing station is ready for setting up, and for indicating a fault report. In that case, the light-emitting elements can light up in different ways, for example in different colors, for the presence of the readiness mode and the presence of the cable on the one hand or for a fault report on the other hand. As soon as, for example, the light-emitting element or elements indicates or indicate that the processing station is ready and the cable end of the cable is present at or in front of the processing station the user knows that from this instant (or by the presence report) the processing process can be carried at the processing station.

A further aspect of the invention relates to a method for operation of cable processing equipment with a processing function and, in particular, for operation of the afore-described cable processing equipment. The method is distinguished by the fact that at least one of the processing stations is set up by means of a local control unit present at the respective processing station.

It is advantageous if, after or through actuation of input means, which are arranged at at least one of the processing stations, of a local control unit for activation of a feed unit for the feed of a cable end the cable is fed to the respective processing station and preferably additionally for activation of a stripping station for prior cutting to length and stripping of the cable end before the cable end enters the processing station. For example, after or through pressing a cable call button for the feed of the cable end to the respective processing station the cable end can be cut to length and stripped in the stripping station and then conducted to the relevant processing station and brought there to an initial setting from which the respective processing station (for example the crimping station) can be individually set up.

If the cable end during the feed process for the feed of the cable end to the respective processing station (for example the crimping station) passes an upstream processing station (for example a bushing station) the feed process can be stopped by action on the input means and the cable end can be fed to the upstream processing station. Assuming, for example, the cable end passes the bushing station on the way to the crimping station, the user can effect a form of 'intermediate stop' at the bushing station. In this intermediate stop the bushing station or depending on circumstances another processing station can be set up. The original feed process can thereafter be continued and concluded. If the cable call button-serving as, for example, the afore-mentioned input means—has to be pressed for the feed process, the afore-mentioned action on the input means for the intermediate stop can be, for example, release or freeing of the cable call button.

The control can, for example, be designed in such a way that for the feed process for the crimping station the cable call button has to be kept pressed until the cable end or the gripper holding the cable end has reached the desired target processing station (i.e. the crimping station). In this case, on passing the bushing station the feed process of the intermediate stop can be effected by releasing or freeing the cable call button.

DESCRIPTION OF THE DRAWINGS

Further advantages and individual features are evident from the following description of an embodiment and from the drawings, in which.

DETAILED DESCRIPTION

Figure 1:
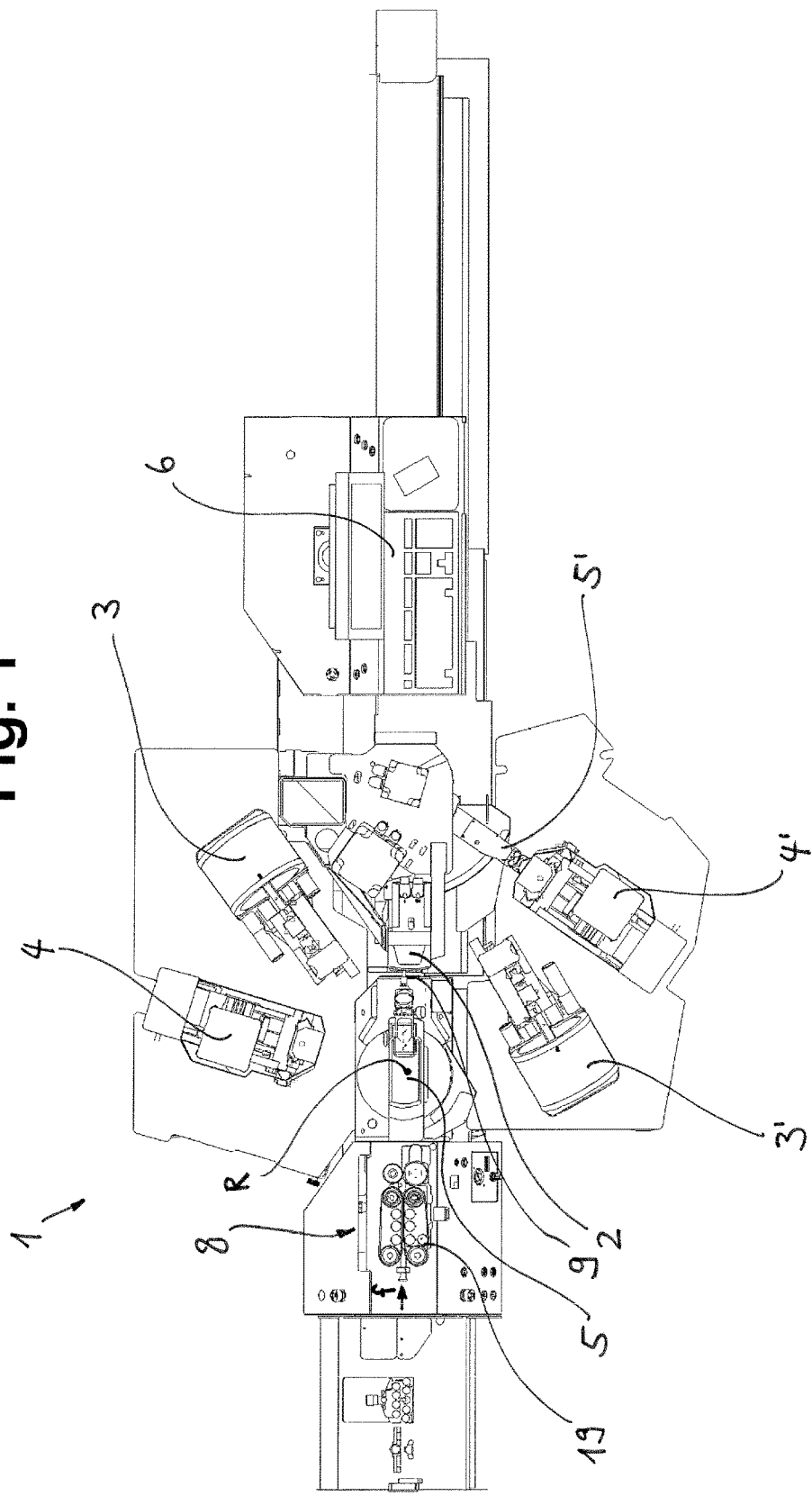
FIG. 1 shows a plan view of cable processing equipment.
Figure 2:
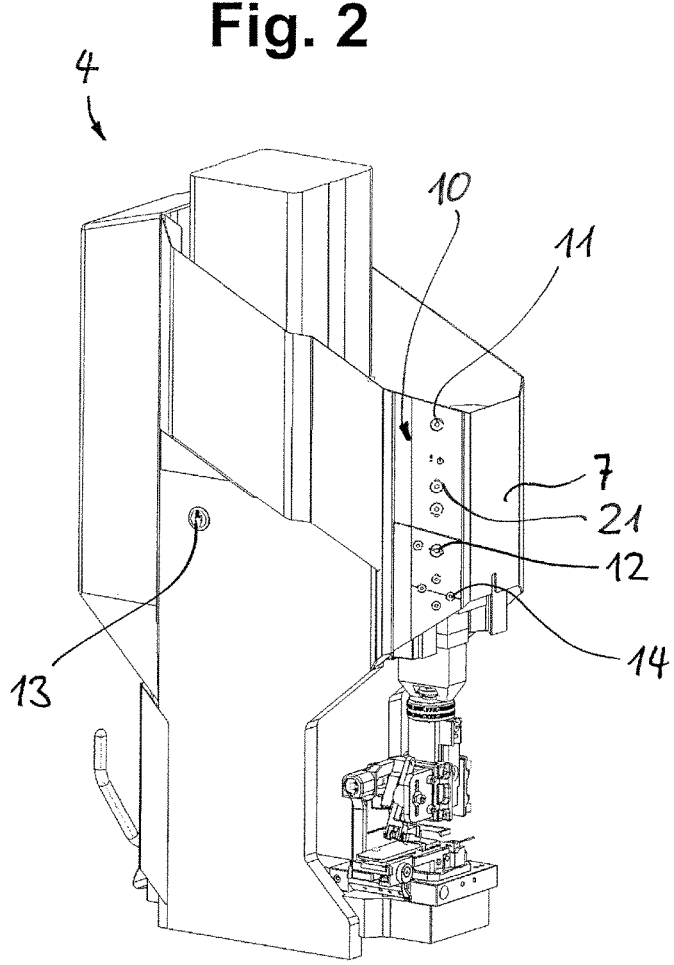
FIG. 2 shows a perspective illustration of a crimping station of the cable processing equipment of FIG. 1.

FIG. 1 shows cable processing equipment, which is denoted overall by 1 and which is constructed as a pivot machine, for the fitting-out of cables (not illustrated here). The cable processing equipment comprises a feed unit 8 with a cable conveying means 19, which has the form of a belt conveyor and which brings the cable along the machine longitudinal axis in f direction to the pivot unit 5. The pivot unit 5 comprises a gripper 9 for holding the cable. A stripping station 2 for cutting to length and stripping the cable is arranged, as evident, on the machine longitudinal axis. Thereagainst, the further processing stations 3 and 4 are arranged near the machine longitudinal axis. The pivot unit 5 has to be rotated about a vertical axis for feeding the cable ends to these processing stations. The corresponding rotational axis of the first pivot unit 5 is denoted by R. The processing station denoted by 3 is a bushing station and the processing station denoted by 4 is a crimping station. The processing stations 3 and 4 are in that case associated with the leading cable end; the processing stations 3' and 4' serve for fitting out the trailing cable ends. The second pivot unit, which is denoted by 5', is in a pivoted-out setting in FIG. 1. Additionally or alternatively, equipping stations for equipping cable ends with plug housings would also be conceivable as processing stations. Such equipping stations are described in, for example, EP 1 251 605 A1. The production operation is controlled and monitored by way a central control unit 6. The central control unit 6 is connected with a control (not illustrated) by way of which the individual processing stations and machine components are activatable for operation of the cable processing equipment 1 for mass production of fitted-out cables. The crimping stations 4 and 4' are equipped with special control units by which the respective processing stations can be locally set up. FIG. 2 shows such a local control unit for the crimping station 4, which is here denoted by 10. The paths to be covered by the operator for the setting up and the need for time are thus reduced. However, the other processing stations (i.e. the bushing stations and the stripping stations) could also be equipped with local control units which are of that kind or at least similar.

The crimping station 4, which is illustrated in FIG. 2, of the cable processing equipment comprises a crimping press 7 for connecting a cable end with a crimp contact. The crimping press 7, which is already known per se, comprises a tool holder which is drivable by means of a motor and movable up and down in vertical direction. A crimping tool is inserted between the tool holder and a bracket of the crimping press. The crimping tool comprises an anvil and a crimping ram for creating the crimp connection. Crimping presses and crimping tools which are of that kind or similar are known per se to the expert. With respect to the construction and mode of operation of crimping presses and crimping tools, reference is made, by way of example, to EP 1 341 269 A1. The present crimping station 4 is distinguished by the fact that it comprises a local control unit 10 for setting up the crimping press 7. The local control unit 10 comprises a control panel in the region of a front side of the crimping press 7. A plurality of buttons 11, 12, 14, the function of which is described in detail in the following, is arranged on this control panel. In addition, the local control unit 10 comprises a button 13, which is explained in more detail in the following, at a side wall of the crimping station 4 in the vicinity of a rear side of the crimping station 4.

The mode of function of the mentioned buttons of the local control unit 10 is as follows: A processing process, in the case of the crimping press thus a crimping process, can be initialized by the button denoted by 11. This button 11 is therefore termed trigger button. The button 13 is provided for safe performance of the setting-up process. This button 13 is an approval button for approval of whether the crimping process is to be executed. The trigger button 11 and the approval button 13 are electronically connected together by way of a control in such a manner that the crimping process can be started only in the case of simultaneous pressing of the buttons 11 and 13. The approval button 13 is arranged at the crimping press 7 at such a distance from the remaining control buttons that only two-handed operation is possible. Since, in the embodiment according to FIG. 2, the trigger button 11 and the approval button 13 are spaced from one another by at least 27 centimeters it is ensured that the crimping station 4 cannot be operated by one hand by a person. The control of the cable processing equipment 1 leads to movements of the crimping press 7 only when the local approval button 13 is pressed at the same time as the trigger button 11. However, for specific applications it would also be conceivable to dispense with the requirement for simultaneous pressing of the two aforesaid buttons. The control could be so arranged that initially the trigger button 11 has to be pressed and thereafter it is confirmed, by pressing the approval button 13, that the processing process triggered by means of the trigger button 11 is actually to be executed. It is possible with the help of creep-speed buttons 21 for the upward movement and the downward movement of the crimping press to be carried out, according to wish, at reduced speed.

The local control unit further comprises a cable call button 12 for activating the feed unit for feeding the cable end of the cable to the crimping station 4. After pressing the cable call button 12 the cable ends pass to a predefined initial setting or, for example, to the last stored gripper setting. The cables are held by a gripper 9 during the feed process, pivoted about the vertical axis and possibly displaced axially along the cable axis in the direction of the crimping tool (cf. FIGS. 1, 4). After the cable ends or the grippers holding the cable ends are in the initial setting thereof the actual setting-up process for setting up the crimping press 7 can be begun. The four positioning buttons denoted by 14 serve that purpose. The gripper of the feed unit can be set upwardly and downwardly and thus in the horizontal position thereof by the upper and lower positioning buttons 14. The control can be designed in such a way that through more lengthy pressing of a positioning button 14 the speed is increased on each occasion by a higher step. The buttons 14 lying at approximately the same height adjacent to one another serve for setting the axial position of the gripper. Thanks to the local cable call button 12 the user can bring up the cable, which is necessary for the setting-up process, to the crimping station 4 in simple manner without having to change over to the central control unit. The control is in that case advantageously designed in such a way that the feed process can be started only when the cable call button 12 and the approval button 13 are pressed simultaneously.

Figure 3:
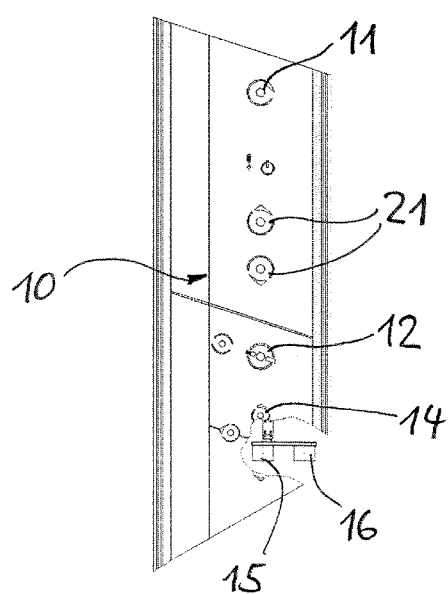
FIG. 3 shows a detail view of a local control unit of the crimping station according to FIG. 2.

FIG. 3 shows a detail view of the control panel of the local control unit 10 of the crimping station. The panel wall is partly broken away in the region of the positioning buttons 14 for setting the axial and horizontal position of the gripper, which holds a cable end of the cable, of the feed unit, whereby the lighting elements 15 and 16 arranged under the positioning buttons 14 can be seen. Lighting elements of that kind can obviously also be arranged under the other buttons for controlling the local control unit 10. Lighting elements of that kind can also be arranged behind the approval button 13. The buttons of the control panel can thus be illuminated. The lighting elements 15 and 16 form indicating means for indicating operational states and can light up in different ways; for example, the lighting element 15 can light up to be red and the lighting element 16 to be white or green. The lighting elements 15, 16 can be respectively constructed as light-emitting diodes. The lighting element 16 lighting up as white or green serves for indicating a readiness mode in which the processing station (i.e. crimping station 4) is ready for setting up. The lighting element 15 lighting up as red serves for indication of a fault report.

The lighting element 16 lighting up as white or green lights up when the cable in the setting-up operation is in front of the crimping station 4, thus the cable is to be positioned, or when the process is executed in, for example, a single cycle or single step. The lighting element 16 can additionally or alternatively light up to be white or green when the cable during feed to another processing station is disposed in the vicinity of the crimping station 4, so as to indicate that stopping at the crimping station 4 can take place so as to also set up the processing station there. The second lighting element 15 lights up to be red or a color different from white or green when a processing error arises in automatic or production operation or in setting-up operation. Processing errors can be, for example, a crimp recognized by the crimping force monitoring means of the crimping press as inadequate. With respect to the bushing station, a processing error could be, for example, a bush recognized by the bush position monitoring means of the bushing station as poorly positioned. The indication of the process error by lighting up the processing station concerned with a differently colored light has the advantage that the operator in the case of an interruption to production can establish at a glance and without having to consult the error report on the computer screen in which processing station an error has arisen.

The buttons 11, 12, 14, 21 are designed in the present case in the form of round control knobs. However, the buttons could obviously also have other button shapes and sizes. Instead of buttons for controlling the local control unit 10, other input means or devices would also be conceivable. For example, touch-sensitive screen surfaces are also possible as an input device. However, input devices could also comprise switches or other input means associated with a computer, such as, for example, a mouse.

Figure 4:
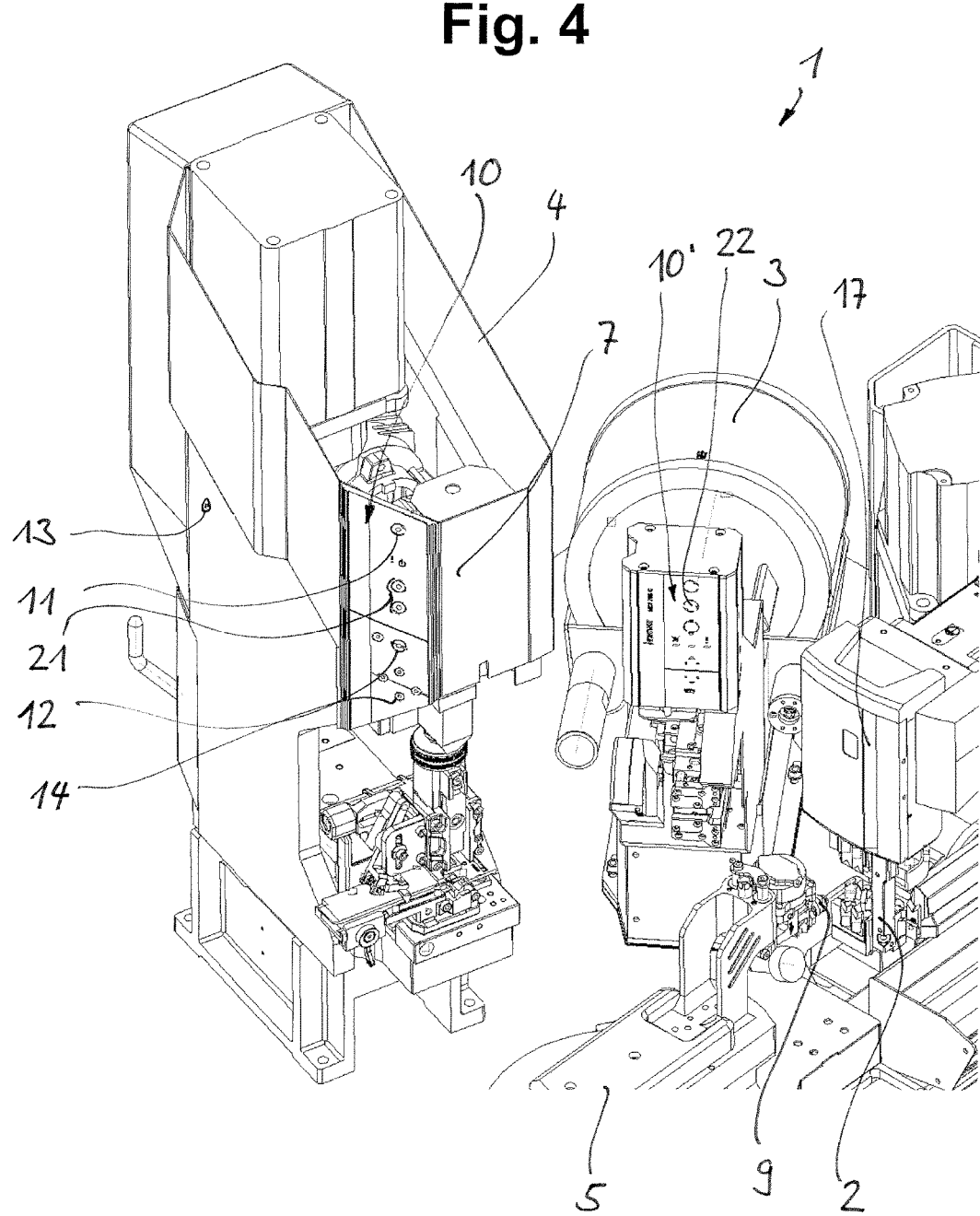
FIG. 4 shows a detail of the cable processing equipment according to FIG. 1 in a perspective illustration.

FIG. 4 shows a detail of the cable processing equipment 1 with pivot unit 5 as well as the three processing stations: stripping unit 2, bushing station 3 and crimping station 4. Apart from the afore-described crimping station 4 equipped with a local control unit 10 the bushing station 3 can also be equipped with a local control unit 10' for setting up the bushing station. The bushing station 3 can comprise buttons for single step operation, for movement to a tool change position and for adjusting the bush conveying. In FIG. 4 the gripper 9 for holding the cable of the pivot unit 5 is disposed in an axial setting on the machine longitudinal axis in front of the stripping station 2.

Thanks to the local control units any other machine operators are better protected, because hazardous actions when the protective hood is open can be triggered only locally. Through appropriate design of the control of the cable processing machine it can be ensured that risk-laden actions with open protective hood have to be locally undertaken by means of the afore-described local trigger button and local approval button. The control of the cable processing machine can be designed in such a way that when the protective hood is open the central control unit is inactive with respect to the setting-up process. The local control unit has the advantage that the operator can have an overview of the entire risk-laden process during the setting up. Equally, this operator would be in the path of a possible second operator, so that the latter can no longer enter the risk-laden region without being noticed.

For reasons of safety, the cable processing equipment 1 comprises protective hoods (not illustrated here) covering all dangerous elements of the machine, particularly the cable advancing means, the cutting head of the stripping station, the pivot arm of the pivot unit as well as the bushing stations and crimping stations. The protective hood can be raised on each occasion for setting up the machine. In the setting-up operation it has to be possible with opened protective hood for all movements of the respective machine to be carried out and operating cycles of the processing stations to be triggered. Risk-laden actions such as, for example, at the crimping station 4 have to be locally triggered by means of the trigger button 11 and the approval button 13 when the protective hood is open. The operator thus has an overview of the entire hazardous process. Suitable indicating means draw the attention of the operator to risk locations and indicate process faults. The indicating means can additionally indicate the process positions. At the same time the indicating means can guide the user in that they switch on at a suitable instant and thus signal that the user can release the cable call button when the user would like to set up the relevant processing station. In this case, the control is designed so that the cable is stopped in the precise processing position.

In order to increase safety during processing of the cable with the protective hood open in the stripping station 2 the cutting head of the stripping station 2 comprises a warning and user guide element 17. The warning element 17 arranged at the stripping station 2 can indicate when the protective hood (not illustrated) is in an open setting. The warning and user guide element 17 can comprise, for example, a series of orange light-emitting diodes arranged behind a plastics-material window. The warning and user guide element 17 can flash shortly before and during processing of the cable by the cutting head of the stripping station 2 (severing and stripping the cable). The warning and user guide element 17 can alternatively or additionally be designed in such a way that it lights up the hazardous region around a knife head with the stripping knives of the stripping station 2, whereby the potentially hazardous situation can be ameliorated by making the region visible.

The entire setting-up process for setting up the first crimping station 4 runs approximately as follows: Initially, the protective hood (not illustrated), which covers the crimping press 7 of the crimping station 4, is opened. Thereafter, the operator at the crimping station 4 presses the cable call button 12 and the approval button 13 simultaneously, whereupon the cable (not illustrated) is fed towards the crimping station 4. After activation of the feed process the cable is cut to length and stripped as needed. The pivot unit 5 during feeding brings the cable end in front of the cable press 7 and stops at the last stored position. The operator can now release the cable call button 12 and the approval button 13; if the operator did it previously, the machine is immediately stationary and moves on when the buttons are pressed again. The actual setting-up process begins thereafter. The operator in that case positions the cable end by the positioning buttons 14. The operator can subsequently trigger and check the crimping process by the trigger button 11 (possibly with additional selection of the creep-speed buttons 21) and simultaneously pressed approval button 13. When the operator has executed a crimping cycle, the cable is thereafter automatically retracted from the crimping tool so that it can be better examined.

If, after the first crimping station 4 has been set up to finished state, the user wants to subsequently set up the second crimping station 4', the user presses the cable call button and the approval button at the second crimping station, whereupon the cable is transported by the pivot units to the extent of the desired cable length and led to the second crimping station. Thereafter, the steps explained and illustrated in the preceding section can be undertaken analogously at the second or trailing cable end.

If the cable end to be fitted out is to have a bush additionally to the crimp connection, the process is adapted as follows: As soon as the cable during feeding of the cable to the crimping station is in a specific angular region in front of or behind the bushing station 3, thus when the cable end has passed the bushing station 3, the operator can interrupt the feed process by releasing the cable call button 12 and/or the approval button 13, whereby the control is signaled that the bushing module is to be set up. Reaching of this angular range can be indicated by switching on a lighting element or other indicating means of the bushing station 3. When this 'intermediate stop' has taken place, the cable is automatically brought into the last stored position for bush fitting. The operator can now locally execute, at the bushing station 3, the equipping process by pressing a trigger button 22 or can set up the bushing station 3. After the conclusion of the setting-up process of the bushing station 3 the cable can subsequently be brought to the press by pressing the cable call button 12 and the approval button 13 at the crimping station 4, whereupon the setting-up procedure at the crimping station 4 can be continued as described in the forgoing.

The above detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A cable processing equipment having a plurality of processing stations for fitting-out a cable by performing processing processes on the cable and a central control unit directly controlling the processing stations to perform a production operation including the processing processes on the cable, comprising:
    a feed unit for feeding the cable to the processing stations;
    at least one of the processing stations including a local control unit for performing a setting-up process on the at least one processing station by an operator operating the local control unit, wherein the setting-up process includes setting up parameters of the at least one processing station prior to a start of the production operation under the control of the central control unit; and
    wherein the local control unit does not control the at least one processing station during the production operation;
    wherein the at least one processing station is a crimping station for producing a crimp connection on the cable by a crimping press, and the local control unit has an input device including independent controls for setting an axial position and a horizontal position of a gripper receiving an end of the cable from the feed unit, the gripper holding the cable end of the cable in the crimping press;
    wherein the local control unit includes a trigger input device for initializing the processing process by the at least one processing station and an approval input device for approval of whether the processing process is to be executed, and wherein the processing process is executed only when the trigger input device and the approval input device are actuated simultaneously or when the approval input device is actuated after the trigger input device is actuated;
    wherein the approval input device is locally separated from the trigger input device sufficient to prevent simultaneous operation of the approval input device and the trigger input device by one human hand.

2. The cable processing equipment according to claim 1 wherein the approval input device and the trigger input means are spaced from one another by at least 27 centimeters.

3. The cable processing equipment according to claim 1 wherein the local control unit includes a cable call input device for activating the feed unit, and wherein the feed unit is activated only when the cable call input device and the approval input device are actuated simultaneously or when the approval input device is actuated after the cable call input device is actuated.

4. The cable processing equipment according to claim 3 wherein the approval input device is locally separated from the cable call input device sufficient to prevent simultaneous operation of the approval input device and the cable call input device by one human hand.

5. The cable processing equipment according to claim 1 wherein the at least one processing station is a crimping station for producing a crimp connection on the cable by a crimping press of the crimping station.

6. The cable processing equipment according to claim 1 wherein at least one region of the cable processing equipment is protected by a protective hood and that optical or acoustic warning and user guide elements are provided, the elements indicating when the protective hood is in an open setting and which, if the optical warning and user guide elements are provided, illuminate at least a sub-region of the at least one region of the cable processing equipment.

7. The cable processing equipment according to claim 1 wherein the local control unit includes indicating elements for indicating operational states of the at least one processing station.

8. The cable processing equipment according to claim 7 wherein the indicating elements include lighting elements for indicating a readiness mode and a presence of the cable, the readiness mode representing that the at least one processing station is ready for the setting-up process, and for indicating a fault report, wherein the lighting elements are differently lit for the readiness mode and the fault report.

9. A cable processing equipment with processing stations and a central control unit controlling the processing stations to perform a production operation of the cable processing equipment on a cable, comprising:
at least one of the processing stations having a local control unit for use by an operator to perform a setting-up process on the at least one processing station to enable the at least one processing station to perform a processing process on the cable during the production operation, wherein the local control unit does not control the at least one processing station during the production operation;
the local control unit including a cable call input device for activating a feed unit for feeding a cable end of a cable to the at least one processing station; and
the local control unit including an approval input device for approval of whether the setting-up process is to be executed and a trigger input device for initializing the setting-up process, the approval input device being locally separated from the trigger input device sufficient to prevent simultaneous operation of the approval input device and the trigger input device by one human hand;
wherein the at least one processing station is a crimping station for producing a crimp connection on the cable end by a crimping press, and the local control unit includes an input device including independent controls for setting an axial position and a horizontal position of a gripper, the gripper holding the cable end of the cable in the crimping press.

10. The cable processing equipment according to claim 9 including a pivot unit rotatable about a vertical axis and having the gripper or a transfer unit with the gripper, which transfer unit is movable along a machine longitudinal axis for transporting the cable.

11. A cable processing equipment operating as a pivot machine with processing stations and a central control unit controlling the processing stations to perform a production operation on a cable, comprising:
a feed unit bringing the cable along a longitudinal axis of the pivot machine, at least one of the processing stations arranged on one side of the longitudinal axis and another of the processing stations being arranged on an opposite side of the longitudinal axis from the one side;
wherein the at least one processing stations has a local control unit for performing a setting-up process on the at least one processing station by an operator to enable the at least one processing station to perform a processing process on the cable during the production operation;
the local control unit including an approval input device for approval of whether the setting-up process is to be executed and a trigger input device for initializing the setting-up process, the approval input device being locally separated from the trigger input device sufficient to prevent simultaneous operation of the approval input device and the trigger input device by one human hand; and
wherein the local control unit includes independent controls for setting an axial position and a horizontal position of a gripper, the gripper holding a cable end of the cable in the at least one processing station.

12. A method of operating cable processing equipment with processing stations and a central control unit controlling the processing stations to perform a production operation of the cable processing equipment, comprising the steps of:
providing a local control unit for at least one of the processing stations wherein the local control unit does not control the at least one processing station during the production operation;
operating the local control unit to perform a setting-up process to locally set up the at least one processing station to perform a processing process on a cable, the local setting up being performed by a person operating the local control unit, wherein the local control unit includes an input device for approval of whether the processing process is to be executed and the input device for approval is locally separated from an input device for triggering the processing process sufficient to prevent simultaneous operation of the input devices by one human hand; and
actuating an input device arranged at the local control unit for activation of a feed unit for feeding a cable end of the cable to the at least one processing station, where the input device includes independent controls for setting an axial position and a horizontal position of a gripper holding the cable end.

* * * * *